Figure 1:
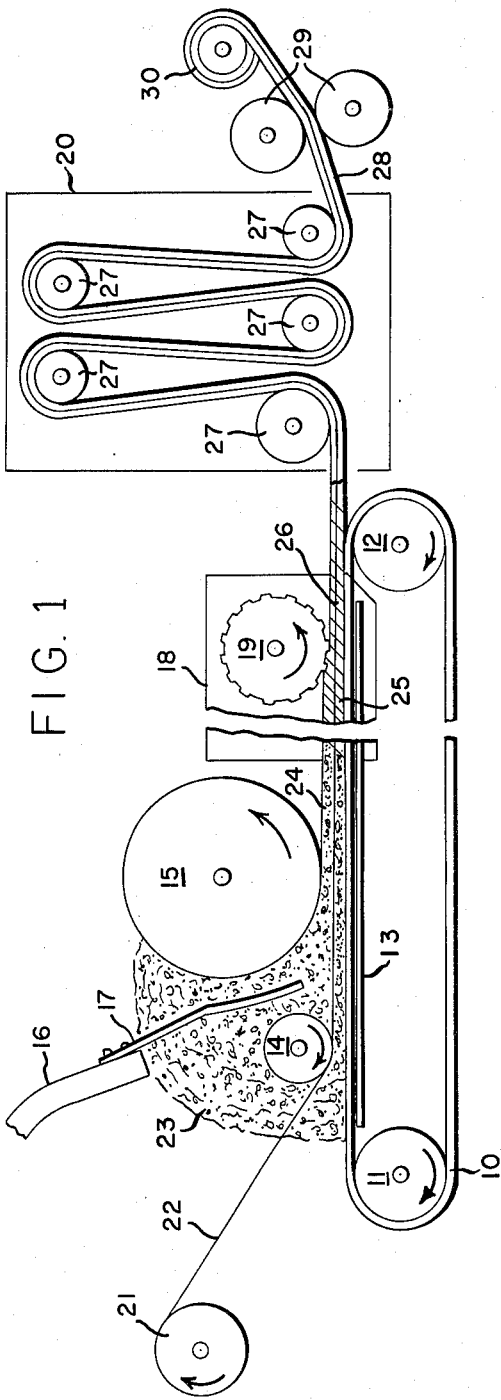

Nov. 7, 1961    H. A. HOUSE    3,007,205
PROCESS OF FORMING A CURED FOAM RUBBER LAYER HAVING
A TEXTILE FABRIC EMBEDDED THEREIN
Filed Aug. 8, 1957

*INVENTOR*
HENRY A. HOUSE

BY *P. J. Poindexter*

AGENT

United States Patent Office 3,007,205
Patented Nov. 7, 1961

3,007,205
PROCESS OF FORMING A CURED FOAM RUBBER LAYER HAVING A TEXTILE FABRIC EMBEDDED THEREIN
Henry Allen House, Fairfield, Conn., assignor to E. I. du Pont de Nemours and Company, Wilmington, Del., a corporation of Delaware
Filed Aug. 8, 1957, Ser. No. 677,010
3 Claims. (Cl. 18—53)

This invention relates to a process for manufacturing foamed sponge rubber reinforced with an embedded fabric. More particularly it relates to a continuous process whereby an open mesh fabric is embedded within the foamed sponge rubber during its formation from a foamed rubber latex composition and resulting product.

One of the best known forms of sponge rubber is "blown" rubber, or chemically blown sponge rubber. Blown rubber sheeting has been used rather widely as rug underlay material to serve as a cushion and prevent the rug from slipping on polished floors, but it has certain inherent drawbacks. For example, the material is somewhat dense and heavy, and its resilience and skid resistance are rather limited. In addition, the disconnected cell structure tends to permit the entrapment of a layer of air between the sheeting and the floor, thereby reducing the anchoring qualities. Manufacture of the material has been possible only by slow and costly methods. For example, a typical process includes the steps of preparing a rubber compound, milling a blowing agent into the prepared compound, calendering into a thin sheet on a carrier fabric, advancing the sheet into a heated press, applying a top liner fabric, intermittently pressing and advancing the sheet until blown and cured, and removing the carrier and top liner fabrics from the cured sheet.

Another well known form of sponge rubber is "foam" rubber, or foamed latex sponge rubber. There is no problem in making foam rubber sheeting having exactly the proper density, resilience and skid resistance desired in rug anchor material, and it is not subject to air entrapment since the interconnected cell structure permits air to pass through it. However, the unreinforced sheeting is too low in tensile strength, i.e., it tears too easily, to be useful in anchoring small rugs.

Various methods are known for producing foam rubber sheeting having a reinforcing fabric bonded to one side. For example, it has been proposed to apply a fabric to the top surface of a layer or foamed latex prior to gelling and curing the layer. The cured product is a reinforced sheeting having satisfactory tensile strength but characterized by certain limitations which have seriously restricted its use as a rug underlay cushion and as an anchoring material to prevent the rug from slipping on polished floors. For example, such qualities as skid resistance, appearance, washability and ease of embossing are appreciably reduced on the side containing the fabric.

It is therefore apparent that in order to produce a thin foam rubber sheeting having sufficient tensile strength without sacrificing other important qualities, a process is needed which is capable of economically embedding a fabric within the foam layer. The present state of the art fails to provide such a process.

The primary object of this invention is to provide a simple and efficient process for manufacturing thin foam rubber sheeting having a fabric embedded therein.

It is also an object to provide a rug underlay material having distinct advantages over those heretofore available.

Other important objects will be apparent from the following description of the invention:

The above objects are accomplished by depositing a bank of foamed rubber latex on a revolving belt in front of a rotating doctor roll mounted transversely above the belt, advancing an open mesh fabric under tension through the bank of foam, by means of a rotating guide roll submerged within the bank of foam a short distance in front of the doctor roll, positioning the fabric so that it enters the central portion of the foamed latex sheet which is continuously formed on the moving belt between the doctor roll and the belt, gelling the foamed latex sheet, and curing the foamed latex sheet with the fabric embedded in the central portion thereof.

A relatively uniform bank of the foamed latex is maintained in front of the doctor roll by means of a supply nozzle which oscillates back and forth through a path immediately above and parallel with the guide roll. Coagulation or gelling of the foam in the bank in front of the doctor roll is prevented by the stirring action provided by a stirring rod attached to and extending beyond the oscillating nozzle.

The moving belt carries the newly formed sheet of liquid foam with fabric embedded in the central portion thereof through a gelation oven. The gelled sheet is preferably roller embossed while supported on the conveyor belt, after which it leaves the belt and passes through a curing oven. The thin vulcanized reinforced foam rubber sheeting emerging from the curing oven is wound up on a storage reel.

Figure 2:
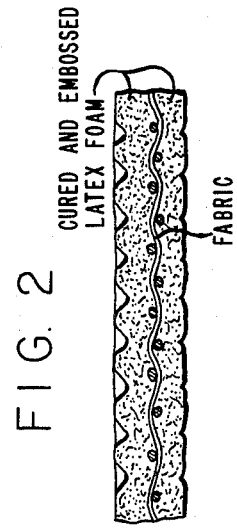

FIGURE 1 is a diagrammatic view of an apparatus in side elevation showing the process in operation and FIGURE 2 is an enlarged cross section of the product.

The principles and practice of this invention will be best understood from the following detailed description of a preferred embodiment, selected for the purpose of illustration.

Referring to FIGURE 1 of the drawing, an endless belt 10 constructed of laminated rubber-coated fabric is mounted for rotation in a clockwise direction around pulleys 11 and 12. Driving means (not shown) is attached to pulley 12. Supporting plate 13 holds the upper or working area of belt 10 substantially even. A guide roll 14, one inch diameter and 60 inches long, is mounted transversely above belt 10 in close proximity of pulley 11 and doctor roll 15 with a clearance between the top surface of belt 10 and the lowermost surface of roll 14. Roll 14 is provided with driving means (not shown) for clockwise rotation which is counter to the direction of movement of an open mesh fabric 22 from supply roll 21. Doctor roll 15, measuring 2½ inches in diameter and 60 inches in length, is juxtaposed the trailing side of guide roll 14 in such a manner that there is a clearance of 2 inches between the innermost or facing surfaces of the two rolls and a clearance of about 190 mils between belt 10 and doctor roll 15. Doctor roll 15 is provided with means (not shown) for counterclockwise rotation. Foam supply nozzle 16, mounted a convenient distance above roll 14, is equipped with means (not shown) for oscillating it back and forth over the entire length of roll 14. Nozzle 16 has an inside diameter of 1½ inches and is attached to a flexible supply line leading from foaming equipment which is fed by a rubber latex supply tank (not shown). Attached to and extending beyond supply nozzle 16 is a stirring rod 17, a thin narrow strip of metal extending to a point about midway between the innermost surfaces of roll 14 and doctor roll 15. Gelation oven 18 surrounds most of the upper portion of belt 10 between doctor roll 15 and pulley 12, and is provided with heating and ventilating means (not shown). Embossing roll 19, having the outer surface engraved to contain numerous small blunt evenly-spaced projections, similar to a fine waffle iron pattern, is rotatably mounted across belt 10 near the exit of oven 18, with a clearance of about 58 mils between belt 10 and the indented area of the lowermost surface of the roll. Immediately beyond pulley 12 is festoon curing oven 20, which comprises a heated tower enclosure with entrance and exit slots, and a series of top and bottom mounted rolls or pulleys 27 over which a moving web or sheet may be passed in a manner common to the art of continuous vulcanization of rubber sheeting.

A known quick gelling foamed latex composition is prepared in accordance with procedures well defined in the prior art. In the preferred embodiment of the invention, a foamable latex composition is formulated from a blended aqueous latex base having a rubber solids content of 70% natural rubber and 30% GR–S, i.e., a rubbery copolymer of about 70 parts butadiene-1,3 and about 30 parts styrene. (All parts and percents specified herein are by weight unless stated otherwise.) Various conventional modifying ingredients are mixed into the latex blend, after which the compound latex is introduced into a foaming or frothing machine. Here the latex composition is whipped with air to the desired density, i.e., an air-to-rubber ratio of 7 to 1 parts by volume. Gelling agents are mixed into the latex foam as it enters the supply line feeding supply nozzle 16. Sufficient of the gelling agents are added to induce complete gelling of the foam within 3 minutes at 210° F. Room temperature coagulation begins in about 10 minutes.

When the process of this invention is in operation, a relatively even bank of quick gelling foamed rubber latex 23 is maintained on moving belt 10 in front of doctor roll 15 by means of a continuous supply of foamed latex flowing from nozzle 16. Guide roll 14 is completely submerged in the bank of foamed latex 23. The nozzle oscillates from one side of belt 10 to the other above roll 14 at the rate of 12 inches per second. In its travel with nozzle 16, stirring rod 17 stirs the central portion of the foamed latex bank 23, between guide roll 14 and doctor roll 15, thereby preventing the formation of product-damaging globules of coagulated latex which are generated by stagnant areas of the foam. A continuous length of open mesh fabric 22 is unwound from supply reel 21. Fabric 22 is a 4 x 4 mesh leno weave rayon fabric (16 openings per square inch) measuring 60 inches in width and weighing 1.1 ounces per linear yard.

The fabric 22 enters the band of foam 23 at an angle of about 30 degrees with belt 10. The foam 23 flows through the interstices of the fabric 22, providing a supply of foam between the fabric 22 and the belt 10. The advancing fabric 22 passes under tension along the lower most surface of guide roll 14, which is rotating in a clockwise direction, at the rate of 30 r.p.m., which is counter to the direction of movement of fabric 22. The rotation of guide roll 14 against the fabric 22 exerts a wiping action on the fabric, thus preventing the formation of stagnant foam layers thereon. Guide roll 14 positions the fabric 22 about 130 mils above the surface of moving belt 10, a position the fabric retains as it leaves guide roll 14 and travels parallel with the belt 10 into the midst of the liquid foamed latex layer or sheet 24 being continuously spread onto belt 10 by doctor roll 15. The liquid foam sheet 24, with fabric 22 embedded therein, is 190 mils thick, as governed by the clearance between doctor roll 15 and belt 10. Doctor roll 15 rotates counter-clockwise at 0.2 r.p.m.; this inhibits coagulation of latex thereon, and facilitates frequent inspection and cleaning thereof. Traveling at the rate of 12 feet per minute, belt 10 carries sheet 24 into and through gelation oven 18, where the sheet is subjected to an air temperature of 200 to 220° F. for a period of 3 minutes. Within this time the latex foam sets or gels, i.e., the liquid foam 23 becomes a non-fluid self-supporting foam structure or gelled sheet 25. Gelation of the foamed latex sheet 24 fixes the position of the fabric therein, viz., about midway between the surfaces of the gelled sheet. Because of the good adhesive friction or traction between gelled sheet 25 and belt 10, the movement of the belt exerts a continuous tension or pull on the embedded fabric 22. This pull is of sufficient force to unwind the fabric 22 from reel 21 and to keep it under tension while advancing through foam bank 23 and into the midst of liquid sheet 24 as described above.

Gelled sheet 25, a non-elastic compressible structure, in its movement with belt 10, passes beneath embossing roll 19, located within oven 18, where it is embossed and compressed by the roll to a thickness of about 58 mils. Embossed sheet 26 is characterized on the top surface by a fine waffle-like type of indented pattern and on the bottom surface by a pinpoint type of indented pattern, the latter resulting from collapse of the foam structure beneath the indentations made in the top surface. Embossed sheet 26 leaves belt 10 and enters curing oven 20 where it passes alternately over a series of upper and lower pulleys in an air temperature of about 280° F. About fifteen minutes after entering oven 20, the sheet 26 emerges as vulcanized reinforced foam rubber sheeting 28, having a thickness of about 55 mils and weighing about 12 ounces per square yard. The embedded fabric is substantially invisible from either side of the sheeting and both surfaces have a pleasing appearance.

Nip rolls 29 pull the sheet through oven 20 at the same rate at which it leaves belt 10. The cured product 28 is wound up on storage reel 30.

Sheets of the cured product 28 were cut to measure slightly smaller than various small rugs. After placing the sheets beneath the rugs on a polished hardwood floor, a 160 pound person walked rapidly back and forth across the rugs. During this test the rugs remained substantially stationary, demonstrating the fact that the product is a highly efficient rug anchor material. The same test was repeated, only the rugs were placed directly in contact with the bare floor. The person found it difficult to keep from falling as the rugs slipped and slid in their usual manner.

Belt 10 may be constructed of any reasonably durable flexible material capable of being rotated in the manner shown and suitable for conveying the foam sheet in the manner described. The surface of the belt should preferably not be extremely smooth in the interest of having good traction between the belt and gelled sheet 25.

Guide roll 14 and doctor roll 15 should be cylindrical in shape and may be constructed of any suitable rigid material inert to the foamed aqueous latex composition. Rotation of guide roll 14 may be in either direction, so long as the speed of rotation is such that its surface provides a wiping action with the moving fabric sufficient to prevent accumulation of coagulated latex on guide roll 14. The position of the fabric in the gelled sheet may be varied by raising or lowering guide roll 14. The diameter of guide roll 14 should be small enough that the roll is submerged in the bank of foamed latex 23.

Doctor roll 15 should be large enough in diameter to retain an adequate bank of foam in which guide roll 14 is submerged. The total thickness of the gelled sheet may be varied by raising or lowering doctor roll 15. Rotation of the doctor roll 15 may be in either direction, preferably at a slow speed near the lower limit required to facilitate cleaning within the room temperature coagulation period of the latex foam, e.g., one revolution every 5 to 10 minutes.

The clearance between the innermost surfaces of guide roll 14 and doctor roll 15 should be from about 1½ to 4 inches, preferably about 2 inches. Having the clearance too small prevents the necessary flow of foam between the rolls, whereas too large a clearance results in the fabric being pushed out of position towards the belt.

In place of oscillating nozzle 16, other means may be employed for maintaining a fairly even and steady bank of foam, such as, e.g., a plurality of stationary nozzles. Also, means equivalent to stirring rod 17 may be used for agitating the foam between rolls 14 and 15, such as, e.g., air jets introduced into the foam. In some embodiments of this invention such agitation may not be necessary.

Gelation oven 18 may be a heat zone of any convenient type having sufficient length and temperature to gel the foam of sheet 24 at whatever rate it is traveling.

While embossing is not essential to the practice of this invention, rug underlay materials are preferably embossed and compressed to enhance their appearance, durability and skid resistance.

Curing oven 20 may be a heat zone of any convenient size and shape in which the gelled sheet may be vulcanized or cured in a continuous manner.

The rubber latex foam composition and its method of preparation are not part of this invention. It is well known in the art that such compositions may be formulated from the latex of natural rubber or any one of various synthetic rubbers, or from blends of two or more of such latices. For example, excellent results with the new process have been obtained by forming the foam from natural rubber latex, synthetic rubber latex, such as, e.g., neoprene latex, copolymers of butadiene and styrene latex and polybutadiene latex. It is preferred that the foamed latex composition have a relatively fast gelation period, i.e., less than 5 minutes at 210° F., to permit good production speed.

Throughout the specification and claims the term "rubber latex" is used to denote a latex formed from either or both natural rubber or synthetic rubber.

It is important that all portions of foam bank 23 and all surfaces of the apparatus in contact therewith be kept moving in such a manner that absolutely no foam remains in the bank long enough to coagulate. Any coagulated particles of latex entering the foam sheet will spoil the appearance of the product; and lead to costly shut-downs in production.

Reinforcing fabric 22 may be any open mesh fabric having interstices through which the latex foam in bank 23 will flow in sufficient volume to continuously fill the space between the fabric and moving belt 10 as the fabric passes through the bank in the prescribed manner. A smooth fiber fabric such as rayon is preferred because a minimum of fiber extends into the interstices to impede the flow of foam. With rayon, a thread count of slightly greater than 4 x 4 can be used, e.g., 5½ x 6. Although a higher thread count will increase the product's tensile strength somewhat, the product also increases proportionately in cost and weight. Lower thread count fabrics are also usable, with a proportionate decrease in strength of product. A fabric weighing about 1.0 to 1.2 ounces per linear yard in 60 inch width and having a thread count of 4 x 4 per inch is usually most desirable for rug underlay purposes.

During its travel through foam bank 23 prior to passing beneath guide roll 14, the fabric 22 should be at an angle of at least 10 degrees and preferably about 20 to 45 degrees with belt 10. There is no particular upper limit for the maximum angle formed by fabric 22 and belt 10, although angles greater than about 90 degrees formed by fabric 22 and belt 10 are not practical since this would interfere with the oscillation of nozzle 16. This is necessary to maintain proper tension to position the fabric above the belt and to facilitate the flow of foam therethrough so that the foam extends below the fabric.

So far as is known, the present invention provides the first known process and apparatus for continuously producing foam rubber sheeting with a fabric embedded in its midst. Simplicity of the apparatus and efficiency of the process are outstanding advantages of the invention. The thin foam sheet, with internally positioned fabric, is formed rapidly from one bank of foam in a single pass beneath one doctor roll. There is no surface fabric to interfere with embossing.

The product of this new process is surprisingly skid resistant and strong for such a thin, lightweight sheeting. Both surfaces are easily washed and substantially equal in skid resistance. The product is particularly well suited for use as rug underlay material.

The novel process and apparatus are not only useful for making rug underlay materials, but other fabric reinforced foam rubber sheet products as well, e.g., shoe insole linings and seat cover paddings.

While there is above disclosed only one detailed embodiment of the apparatus, process and product of the invention herein presented, it is possible to produce still other embodiments within the inventive concept described, and it is desired therefore that only such limitations be imposed on the appended claims as are stated therein, or required by prior art.

The embodiments of the invention in which an exclusive property or privilege is claimed are defined as follows:

1. A continuous process of forming a cured foam rubber layer having a textile fabric embedded in the central portion thereof which comprises,
    (a) continuously forming a horizontal elongated bank of foamed gellable rubber latex,
    (b) continuously introducing an open mesh fabric under tension into said bank of foam at a longitudinal angle of 10°–90° with the horizontal,
    (c) continuing the passage of said fabric at said angle into said bank of foam,
    (d) changing the direction of passage of said fabric while immersed in said bank of foam to a horizontal direction,
    (e) continuously forming from said bank, a layer of substantially uniform thickness, whereby said fabric is positioned in the central portion of said layer, and
    (f) heating said layer to gell and cure said foam to permanently position the fabric in the central portion thereof.

2. The process of claim 1 in which the open mesh fabric has a leno weave.

3. The process of claim 1 in which said longitudinal angle is about 20°–45°.

References Cited in the file of this patent

UNITED STATES PATENTS

| | | |
|---|---|---|
| 956,503 | Pendleton | Apr. 26, 1910 |
| 2,017,339 | Bryant et al. | Oct. 15, 1935 |
| 2,057,701 | Zonino | Oct. 20, 1936 |
| 2,163,289 | Pennel et al. | June 20, 1939 |
| 2,175,798 | Hauser | Oct. 10, 1939 |
| 2,339,142 | Bodle et al. | Jan. 11, 1944 |
| 2,358,962 | Cunningham | Sept. 26, 1944 |
| 2,421,625 | Kretschmer | June 3, 1947 |
| 2,585,109 | Gordon | Feb. 12, 1952 |
| 2,648,619 | Alderfer | Aug. 11, 1953 |
| 2,668,987 | Harris et al. | Feb. 16, 1954 |
| 2,716,778 | Beare | Sept. 6, 1955 |
| 2,719,795 | Nottebohm | Oct. 4, 1955 |
| 2,770,026 | Petersilie et al. | Nov. 13, 1956 |
| 2,795,207 | Marco | June 11, 1957 |
| 2,817,597 | Alderfer | Dec. 24, 1957 |
| 2,836,221 | Bove | May 27, 1958 |
| 2,841,205 | Bird | July 1, 1958 |
| 2,879,197 | Muskat et al. | Mar. 24, 1959 |

FOREIGN PATENTS

| | | |
|---|---|---|
| 1,092,438 | France | Nov. 10, 1954 |